United States Patent
Wang et al.

(10) Patent No.: US 11,868,012 B2
(45) Date of Patent: Jan. 9, 2024

(54) TRANSPARENT DISPLAY PANEL AND METHOD FOR MANUFACTURING THE SAME, AND ELECTRONIC DEVICE

(71) Applicant: BOE Technology Group Co., Ltd., Beijing (CN)

(72) Inventors: Long Wang, Beijing (CN); Nanfang Jia, Beijing (CN); Yidan Peng, Beijing (CN); Jian Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 248 days.

(21) Appl. No.: 17/419,821

(22) PCT Filed: Sep. 29, 2020

(86) PCT No.: PCT/CN2020/118872
§ 371 (c)(1),
(2) Date: Jun. 30, 2021

(87) PCT Pub. No.: WO2022/067517
PCT Pub. Date: Apr. 7, 2022

(65) Prior Publication Data
US 2022/0121056 A1    Apr. 21, 2022

(51) Int. Cl.
*G02F 1/1343* (2006.01)
*G02F 1/1335* (2006.01)
(Continued)

(52) U.S. Cl.
CPC ........ *G02F 1/13439* (2013.01); *G02F 1/1334* (2013.01); *G02F 1/13775* (2021.01);
(Continued)

(58) Field of Classification Search
CPC ......... G02F 1/133524; G02F 1/133615; G02F 1/1334; G02F 1/13775
See application file for complete search history.

(56) References Cited

U.S. PATENT DOCUMENTS

| | | |
|---|---|---|
| 9,910,335 B1 | 3/2018 | Wang et al. |
| 10,802,200 B2 | 10/2020 | Kim et al. |

(Continued)

FOREIGN PATENT DOCUMENTS

| | | |
|---|---|---|
| CN | 106292030 A | 1/2017 |
| CN | 108628024 A | 10/2018 |

(Continued)

*Primary Examiner* — Paisley L Wilson
(74) *Attorney, Agent, or Firm* — Westman, Champlin & Koehler, P.A.

(57) ABSTRACT

The embodiments of the present disclosure provide a transparent display panel, including: a first substrate; a second substrate; and a liquid crystal layer; a light guide plate; a light source assembly; and a plurality of pixel units, wherein the plurality of pixel units includes a first pixel unit and a second pixel unit, a distance from a center of an orthographic projection of the first pixel unit on a light exit surface of the light guide plate to the light incident surface of the light guide plate is less than that of the second pixel unit, and an area of an orthographic projection of an effective modulation area of the liquid crystal layer in the first pixel unit on the light exit surface of the light guide plate is less than that in the second pixel unit.

15 Claims, 7 Drawing Sheets

(51) Int. Cl.
*G02F 1/1334* (2006.01)
*G02F 1/13357* (2006.01)
*G02F 1/137* (2006.01)

(52) U.S. Cl.
CPC .. *G02F 1/133512* (2013.01); *G02F 1/133524* (2013.01); *G02F 1/133615* (2013.01); *G02F 1/134309* (2013.01)

(56) References Cited

U.S. PATENT DOCUMENTS

| | | |
|---|---|---|
| 11,086,176 B2 | 8/2021 | Wang et al. |
| 2018/0059448 A1 | 3/2018 | Wang et al. |
| 2020/0073039 A1 | 3/2020 | Kim et al. |
| 2021/0181560 A1 | 6/2021 | Wang et al. |
| 2022/0026752 A1* | 1/2022 | Okuyama ......... G02F 1/133615 |

FOREIGN PATENT DOCUMENTS

| | | |
|---|---|---|
| CN | 110873981 A | 3/2020 |
| CN | 111487710 A | 8/2020 |

* cited by examiner

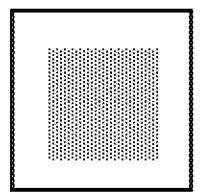
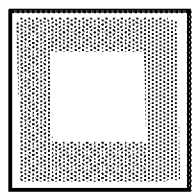
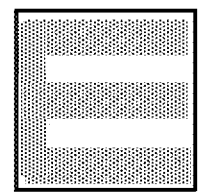
FIG. 4A     FIG. 4B     FIG. 4C
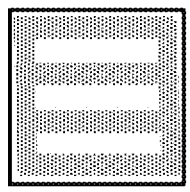
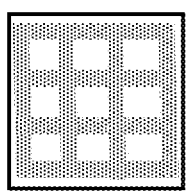
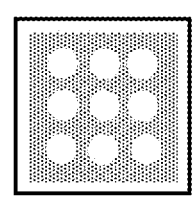
FIG. 4D     FIG. 4E     FIG. 4F
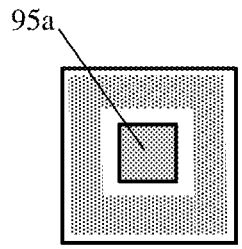
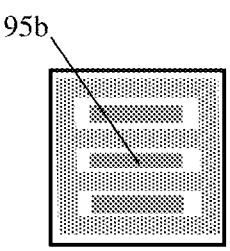
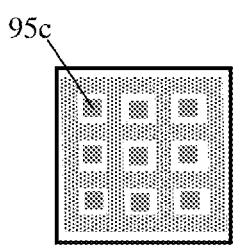
FIG. 4G     FIG. 4H     FIG. 4I
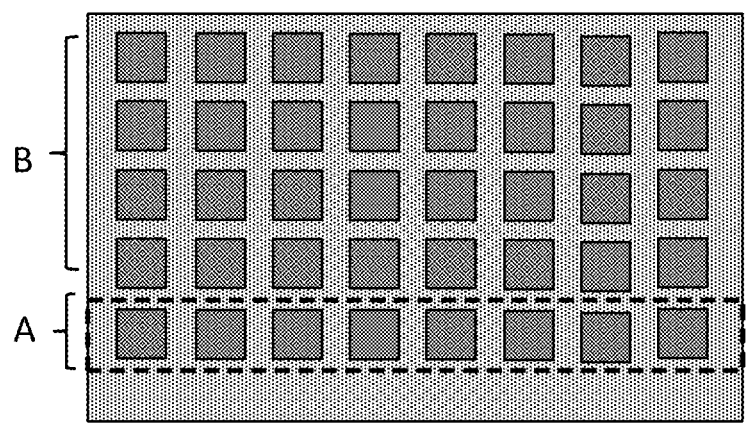
FIG. 4J

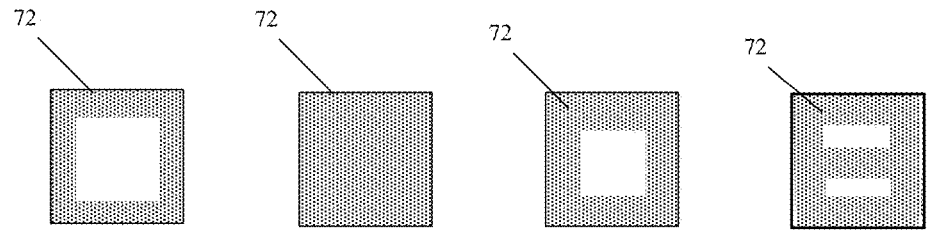
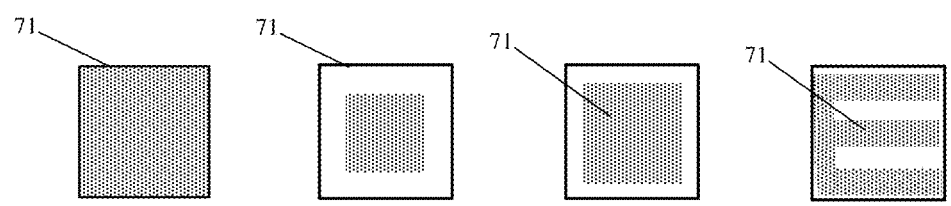
FIG. 6A    FIG. 6B    FIG. 6C    FIG. 6D
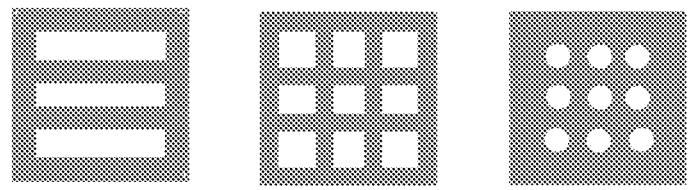
FIG. 7A    FIG. 7B    FIG. 7C
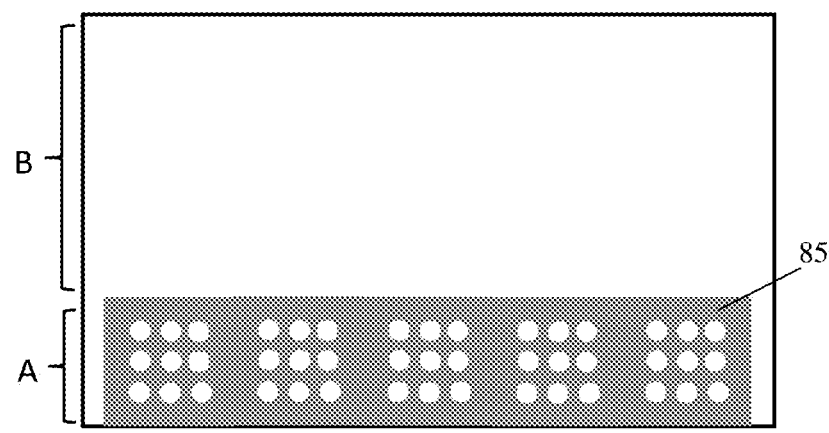
FIG. 7D

TRANSPARENT DISPLAY PANEL AND METHOD FOR MANUFACTURING THE SAME, AND ELECTRONIC DEVICE

CROSS REFERENCE TO RELATED APPLICATIONS

This application is a Section 371 National Stage Application of International Application No. PCT/CN2020/118872, filed on Sep. 29, 2020, entitled "TRANSPARENT DISPLAY PANEL AND METHOD FOR MANUFACTURING THE SAME, AND ELECTRONIC DEVICE", the disclosures of which are incorporated herein by reference in their entireties.

TECHNICAL FIELD

The present disclosure relates to a field of display technology, and in particular to a transparent display panel, a method for manufacturing the transparent display panel, and an electronic device.

BACKGROUND

Transparent display is a widely demanded technology that may be used in applications that not only needs to display images, but also needs to see a scene behind a screen, such as in-vehicle display, window display, home display, and wearable display. Transparent display may be realized by means of a liquid crystal layer formed of a composite of polymer and liquid crystal (for example, polymer network stabilized liquid crystal (PSLC) or polymer dispersed liquid crystal (PDLC)). When a transparent display screen needs to be displayed, a voltage is applied to a display area of the liquid crystal layer to deflect the liquid crystal and scatter light, so as to realize a display function. When the screen does not need to display, no voltage is applied on both sides of the liquid crystal layer. Such a panel usually includes a structure of two substrates and a liquid crystal layer sandwiched between the two substrates.

SUMMARY

The embodiments of the present disclosure provide a transparent display panel, including: a first substrate; a second substrate; a liquid crystal layer located between the first substrate and the second substrate; a light guide plate located on a side of the first substrate away from the second substrate, wherein the light guide plate has a light incident surface on an outer peripheral side of the light guide plate; a light source assembly arranged to emit a light beam toward the light incident surface of the light guide plate; and a plurality of pixel units on the transparent display panel, wherein the plurality of pixel units includes a first pixel unit and a second pixel unit, wherein a distance from a center of an orthographic projection of the first pixel unit on a light exit surface of the light guide plate to the light incident surface of the light guide plate is less than a distance from a center of an orthographic projection of the second pixel unit on the light exit surface of the light guide plate to the light incident surface of the light guide plate, and wherein an area of an orthographic projection of an effective modulation area of the liquid crystal layer in the first pixel unit on the light exit surface of the light guide plate is less than an area of an orthographic projection of an effective modulation area of the liquid crystal layer in the second pixel unit on the light exit surface of the light guide plate.

In some embodiments, the distance from the center of the orthographic projection of the first pixel unit on the light exit surface of the light guide plate to the light incident surface of the light guide plate is less than a first threshold; the distance from the center of the orthographic projection of the second pixel unit on the light exit surface of the light guide plate to the light incident surface of the light guide plate is greater than the first threshold; and the first threshold is 10 to 50 times a distance between a surface of the second substrate away from the liquid crystal layer and a surface of the light guide plate away from the liquid crystal layer.

In some embodiments, the area of the orthographic projection of the effective modulation area of the liquid crystal layer in the first pixel unit on the light exit surface of the light guide plate is 20% to 80% of the area of the orthographic projection the effective modulation area of the liquid crystal layer in the second pixel unit on the light exit surface of the light guide plate.

In some embodiments, the area of the orthographic projection of the effective modulation area of the liquid crystal layer in the first pixel unit on the light exit surface of the light guide plate is 40% to 60% of the area of the orthographic projection the effective modulation area of the liquid crystal layer in the second pixel unit on the light exit surface of the light guide plate.

In some embodiments, the plurality of pixel units further include a third pixel unit; and wherein the distance from the center of the orthographic projection of the first pixel unit on the light exit surface of the light guide plate to the light incident surface of the light guide plate is less than the first threshold and greater than a second threshold, a distance from a center of an orthographic projection of the third pixel unit on the light exit surface of the light guide plate to the light incident surface of the light guide plate is less than the second threshold, and an area of an orthographic projection of an effective modulation area of the liquid crystal layer in the third pixel unit on the light exit surface of the light guide plate is less than the area of the orthographic projection of the effective modulation area of the liquid crystal layer in the first pixel unit on the light exit surface of the light guide plate.

In some embodiments, the plurality of pixel units further include a fourth pixel unit; and wherein the distance from the center of the orthographic projection of the third pixel unit on the light exit surface of the light guide plate to the light incident surface of the light guide plate is less than the second threshold and greater than a third threshold, a distance from a center of an orthographic projection of the fourth pixel unit on the light exit surface of the light guide plate to the light incident surface of the light guide plate is less than the third threshold, and an area of an orthographic projection of an effective modulation area of the liquid crystal layer in the fourth pixel unit on the light exit surface of the light guide plate is less than the area of the orthographic projection of the effective modulation area of the liquid crystal layer in the third pixel unit on the light exit surface of the light guide plate.

In some embodiments, a difference between the first threshold and the second threshold is equal to a difference between the second threshold and the third threshold; and wherein the area of the orthographic projection of the effective modulation area of the liquid crystal layer in the first pixel unit on the light exit surface of the light guide plate, the area of the orthographic projection of the effective modulation area of the liquid crystal layer in the third pixel unit on the light exit surface of the light guide plate, and the area of the orthographic projection of the effective modulation area of the liquid crystal layer in the fourth pixel unit on the light exit surface of the light guide plate decreases successively 5% to 10% of the area of the orthographic projection of the effective modulation area of the liquid crystal layer in the second pixel unit on the light exit surface of the light guide plate.

In some embodiments, the pixel units at distances greater than the first threshold from centers of orthographic projections of the pixel units on the light exit surface of the light guide plate to the light incident surface of the light guide plate have a same area of the effective modulation area of the liquid crystal layer.

In some embodiments, areas of effective modulation areas of the liquid crystal layer in a plurality of pixel units at distances less than the first threshold from centers of orthographic projections of the plurality of pixel units on the light exit surface of the light guide plate to the light incident surface of the light guide plate decrease as the distances from the centers of the orthographic projections of the plurality of pixel units on the light exit surface of the light guide plate to the light incident surface of the light guide plate decrease.

In some embodiments, the first pixel unit includes a first transparent electrode and a second transparent electrode for modulating the liquid crystal layer; and the second pixel unit includes a third transparent electrode and a fourth transparent electrode for modulating the liquid crystal layer; and the effective modulation area of the liquid crystal layer in the first pixel unit is an overlapping area of an orthographic projection of the first transparent electrode on the light exit surface of the light guide plate and an orthographic projection of the second transparent electrode on the light exit surface of the light guide plate, and the effective modulation area of the liquid crystal layer in the second pixel unit is an overlapping area of an orthographic projection of the third transparent electrode on the light exit surface of the light guide plate and an orthographic projection of the fourth transparent electrode on the light exit surface of the light guide plate.

In some embodiments, the first transparent electrode and the third transparent electrode are located on a side of the liquid crystal layer facing the light exit surface of the light guide plate; and the second transparent electrode and the fourth transparent electrode are located on a side of the liquid crystal layer facing the second substrate; and an area of an orthographic projection of at least one of the first transparent electrode and the second transparent electrode on the light exit surface of the light guide plate is less than an area of an orthographic projection of at least one of the third transparent electrode and the fourth transparent electrode on the light exit surface of the light guide plate.

In some embodiments, the first transparent electrode and the third transparent electrode are located on a side of the liquid crystal layer facing the light exit surface of the light guide plate, and the second transparent electrode and the fourth transparent electrode are located on a side of the liquid crystal layer facing the second substrate, and a hollow pattern is formed in one or both of the first transparent electrode and the second transparent electrode.

In some embodiments, the first pixel unit further includes a dummy electrode, and the dummy electrode is not electrically connected to the first transparent electrode and the second transparent electrode, and the orthographic projection of the first transparent electrode or the second transparent electrode on the light exit surface of the light guide plate has a hollow area, and an orthographic projection of the dummy electrode on the light exit surface of the light guide plate is located in the hollow area.

In some embodiments, the first pixel unit further includes a dummy electrode, and the dummy electrode is not electrically connected to the first transparent electrode and the second transparent electrode, and the orthographic projection of one of the first transparent electrode and the second transparent electrode on the light exit surface of the light guide plate has a hollow area, and an orthographic projection of the dummy electrode on the light exit surface of the light guide plate is located in the hollow area, and at least partially overlap with the orthographic projection of another of the first transparent electrode and the second transparent electrode on the light exit surface of the light guide plate.

In some embodiments, an area of an orthographic projection of a liquid crystal polymerization area in the first pixel unit on the light exit surface of the light guide plate is less than an area of an orthographic projection of a liquid crystal polymerization area in the second pixel unit on the light exit surface of the light guide plate.

In some embodiments, the area of the orthographic projection of the liquid crystal polymerization area in the first pixel unit on the light exit surface of the light guide plate is 40% to 60% of the area of the orthographic projection of the liquid crystal polymerization area in the second pixel unit on the light exit surface of the light guide plate.

In some embodiments, the liquid crystal layer includes a polymer network stabilized liquid crystal or a polymer dispersed liquid crystal.

The embodiments of the present disclosure further provide a method for manufacturing a transparent display panel, including: providing a first substrate, a second substrate, and a liquid crystal layer between the first substrate and the second substrate; providing a light guide plate on a side of the first substrate away from the second substrate, wherein the light guide plate has a light incident surface on an outer peripheral side of the light guide plate; providing a light source assembly, wherein the light source assembly is configured to emit a light beam toward the light incident surface of the light guide plate; and providing a plurality of pixel units on the transparent display panel, wherein the plurality of pixel units includes a first pixel unit and a second pixel unit, wherein a distance from a center of an orthographic projection of the first pixel unit on a light exit surface of the light guide plate to the light incident surface of the light guide plate is less than a distance from a center of an orthographic projection of the second pixel unit on the light exit surface of the light guide plate to the light incident surface of the light guide plate, and wherein an area of an orthographic projection of an effective modulation area of the liquid crystal layer in the first pixel unit on the light exit surface of the light guide plate is less than an area of an orthographic projection of an effective modulation area of the liquid crystal layer in the second pixel unit on the light exit surface of the light guide plate.

In some embodiments, providing a plurality of pixel units on the transparent display panel includes: patterning one or both of a first transparent electrode and a second transparent electrode in the first pixel unit, so that an overlapping area of an orthographic projection of the first transparent electrode in the first pixel unit on the light exit surface of the light guide plate and an orthographic projection of the second transparent electrode in the first pixel unit on the light exit surface of the light guide plate is less than an overlapping area of an orthographic projection of a first transparent electrode in the second pixel unit on the light exit surface of the light guide plate and an orthographic projection of a second transparent electrode in the second pixel unit on the light exit surface of the light guide plate.

In some embodiments, providing a plurality of pixel units on the transparent display panel includes: irradiating the liquid crystal layer between the first substrate and the second substrate with ultraviolet by using a mask, wherein a light-shielding area of an area in which the mask and the first pixel unit overlap is less than a light-shielding area of an area in which the mask and the second pixel unit overlap.

The embodiments of the present disclosure further provide an electronic device including the transparent display panel according to any one of the above embodiments.

BRIEF DESCRIPTION OF THE DRAWINGS

By reading the detailed description of the non-limiting embodiments with reference to the following drawings, other features, purposes and advantages of the present disclosure will become more apparent.

FIG. 4A, FIG. 4B, FIG. 4C, FIG. 4D, FIG. 4E, FIG. 4F, FIG. 4G, FIG. 4H, FIG. 4I, and FIG. 4J are schematic diagrams of patterned pixel electrodes in a near light source area on a first substrate.

FIG. 6A, FIG. 6B, FIG. 6C, and FIG. 6D are schematic diagrams of combinations of patterned pixel electrodes in a near light source area on a first substrate and a second substrate.

FIG. 7A, FIG. 7B, FIG. 7C, and FIG. 7D are schematic diagrams for patterning the liquid crystal polymerization area in a pixel unit in a transparent display panel.

DETAILED DESCRIPTION OF EMBODIMENTS

Figure 1:
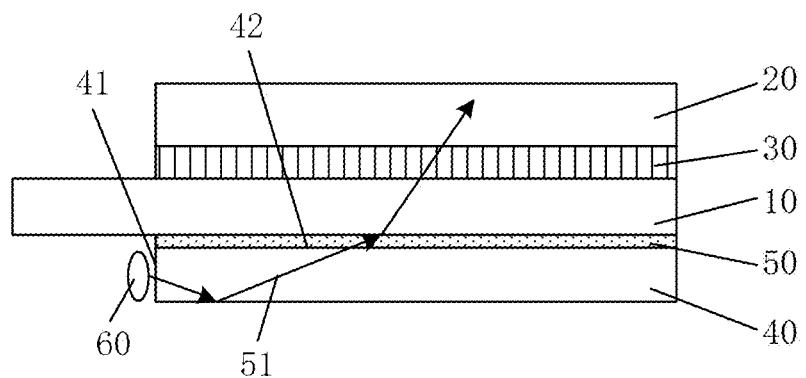
FIG. 1 is a schematic diagram of a light incident principle of a transparent display panel with a light guide plate according to the embodiments of the present disclosure.

The present disclosure will be further described in detail below with reference to the accompanying drawings and embodiments. It should be understood that the specific embodiments described here are only used to describe the related invention, but not to limit the invention. In addition, it should be noted that, for ease of description, only the parts related to the invention are shown in the accompanying drawings.

It should be noted that the embodiments in the present disclosure and the features in the embodiments may be combined with each other if there is no conflict.

In addition, in the following detailed description, for the convenience of explanation, many specific details are set forth to provide a comprehensive understanding of the embodiments of the present disclosure. However, obviously, one or more embodiments may also be implemented without these specific details.

It should be understood that, although the terms first, second, etc. may be used herein to describe various elements, these elements should not be limited by these terms. These terms are only used to distinguish one element from another. For example, without departing from the scope of the exemplary embodiment, the first element may be named as the second element, and similarly, the second element may be named as the first element. The term "and/or" as used herein includes any and all combinations of one or more of the related listed items.

It should be understood that when an element or layer is referred to as being "formed on" another element or layer, the element or layer may be directly or indirectly formed on the another element or layer. That is, for example, there may be an intermediate element or an intermediate layer. In contrast, when an element or layer is referred to as being "directly formed on" another element or layer, there are no intervening elements or intervening layers. Other terms used to describe relationships between elements or layers should be interpreted in a similar manner (for example, "between" and "directly between", "adjacent" and "directly adjacent" etc.).

The terms used herein are only for a purpose of describing specific embodiments, and are not intended to limit the embodiments. As used herein, unless the context clearly dictates otherwise, the singular form is also intended to include the plural form. It will also be understood that when the terms "including" and/or "comprising" are used herein, it means that the described features, wholes, steps, operations, elements and/or components are present, but do not exclude the presence or addition of one or more other features, wholes, steps, operations, elements, components, and/or combinations thereof.

In the present disclosure, unless otherwise specified, the expressions "located on a same layer" and "arranged on a same layer" generally mean that a first component and a second component may use a same material and may be formed by a same patterning process. The expressions "located on different layers" and "arranged on different layer" generally mean that a first component and a second component may be formed by different patterning processes.

FIG. 1 shows a schematic diagram of a transparent display panel 100. The transparent display panel 100 includes a first substrate 10, a second substrate 20, and a liquid crystal layer 30 located between the first substrate 10 (for example, an array substrate) and the second substrate 20 (for example, a cover plate). A light guide plate 40 is arranged on a side of the first substrate 10 away from the second substrate 20. For example, the light guide plate 40 may be adhered to a surface of the first substrate 10 on the side of the first substrate 10 away from the second substrate 20 by optical glue 50. In this embodiment, a side incident manner is adopted, that is, a light incident surface 41 of the light guide plate 40 is on an outer peripheral side of the light guide plate 40. The outer peripheral side of the light guide plate 40 refers to a side surface of the light guide plate 40 excluding a light exit surface directly opposite to the first substrate 10 and a surface opposite to the light exit surface, and the side surface is located at the periphery of the light guide plate 40. A light source assembly 60 may be arranged to emit a light beam 51 toward the light incident surface 41 of the light guide plate 40. After the light beam 51 enters the light guide plate 40, it is reflected by the light guide plate 40 and then exits from the light exit surface 42 toward the first substrate 10. At least a part of the light beam 51 passes through the first substrate 10, the liquid crystal layer 30 and the second substrate 20 and exits from the second substrate 20, so as to realize a display function. The light exit surface 42 of the light guide plate 40 is arranged on a side of the light guide plate 40 facing the first substrate 10.

Figure 3:
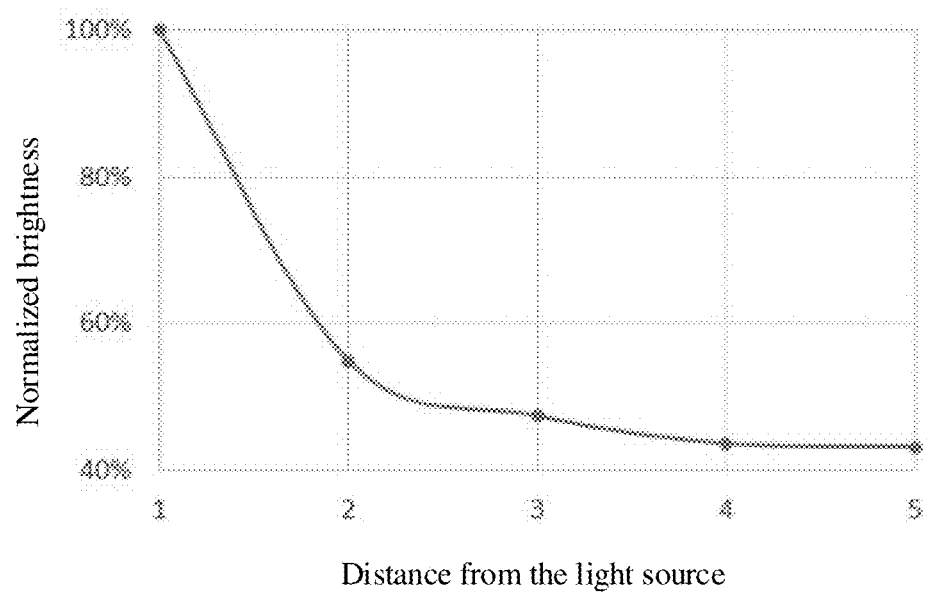
FIG. 3 is a diagram showing a relationship between a normalized display brightness of the transparent display panel and a distance from the light source assembly.

It should be noted that since each film layer in the transparent display panel 100 may inevitably absorb the energy of the light beam, when the light beam 51 propagates in the transparent display panel 100, the light beam 51 may be significantly attenuated as a distance from the light source assembly 60 increases, so that the brightness of the transparent display panel 100 is uneven. The arrangement of the light guide plate 40 may obviously alleviate the problem of uneven brightness, and especially has a significant improvement effect on the uniformity of display brightness in areas away from the light source assembly. However, the display brightness at a location close to the light source assembly is still significantly higher than the display brightness at a location away from the light source assembly. FIG. 3 shows an exemplary relationship diagram between a normalized display brightness of the transparent display panel and a distance from the light source assembly. The abscissas and ordinates of FIG. 3 are all normalized values. The abscissa indicates a distance from the light source assembly, the larger the value, the farther the distance from the light source assembly. The ordinate indicates the display brightness, the larger the value, the higher the brightness. It may be clearly seen from FIG. 3 that in the near light source area on the transparent display panel, as the distance from the light source assembly increases, the display brightness initially has a sharp drop, and then tends to level off. An area where the distance from the light source assembly is relatively close and the display brightness changes significantly as the distance from the light source assembly increases may be referred to as a near light source area. A problem of uneven display brightness is likely to occur in the near light source area.

The following discusses how to improve the problem of uneven display brightness in the near light source area on the transparent display panel. In order to facilitate a definition of the near light source area described above, the concept of threshold will be introduced below. That is, when a distance between an orthographic projection of a certain part of the transparent display panel on the light exit surface 42 of the light guide plate 40 and the light incident surface 41 of the light guide plate 40 is less than a threshold, the certain part is considered to be in the near light source area.

The transparent display panel is different from a liquid crystal display panel used in a conventional liquid crystal display. The conventional liquid crystal display panel uses electrodes to apply voltage to the liquid crystal layer to change an influence of the liquid crystal layer on a polarization direction of polarized light, and detects a state of the emitted polarized light through an analyzer (usually formed by a polarizing film) located on a light exit side of the liquid crystal layer (polarized light with different polarization directions corresponds to different transmittances of the analyzer), so as to display images. Therefore, in a conventional liquid crystal display, the polarizing films (one is a polarizer and another is an analyzer) on both sides of the liquid crystal layer are indispensable components.

The liquid crystal layer 30 in the transparent display panel 100 according to the present disclosure may be in a transmission state and at least one scattering state under an action of a voltage. The liquid crystal layer 30 in the transmission state may allow light to pass through, so that the light may be, for example, totally reflected back and forth between the first substrate 10 or the light guide plate and the second substrate 20 after passing through the liquid crystal layer 30. The liquid crystal layer 30 in the scattering state may scatter the light, thereby changing a traveling direction of the light. In this way, after the light passes through the liquid crystal layer 30 in the scattering state, a considerable amount of light is no longer totally reflected at a surface of the second substrate 20 away from the liquid crystal layer 30 (an upper surface in FIGS. 1 and 2) and a surface of the light guide plate 40 away from the liquid crystal layer 30 (a lower surface in FIGS. 1 and 2), so that the light may exit from the transparent display panel. The liquid crystal layer 30 may include, for example, a polymer network stabilized liquid crystal. It should be noted that although the embodiments of the present disclosure shown in FIG. 1 shows one light source assembly, the embodiments of the present disclosure are not limited thereto. For example, the transparent display panel 100 may also have two light source assemblies. In the embodiments of the present disclosure, images may be observed from both the upper and lower sides of the transparent liquid crystal display panel.

In some embodiments, the liquid crystal layer 30 may be in a form of a composite film layer of polymer and liquid crystal, for example, made of polymer network stabilized liquid crystal (PSLC) or polymer dispersed liquid crystal (PDLC) material. The polymer network stabilized liquid crystal material is a photoelectric composite material in which a small amount of polymer forms a network to stabilize an orientation of the liquid crystal. The refractive index changes due to the different alignment and orientation of the liquid crystal molecules in the polymer network. When no electric field is applied, the polymer network stabilizes the liquid crystal material in a transparent state (that is, a light transmission state). An anchoring effect between the network and the liquid crystal may limit the reorientation of some liquid crystal molecules in the electric field, causing the liquid crystal molecules to be disorderly arranged, showing different refractive indexes, and scattering the incident light (that is, the polymer network stabilizes the liquid crystal material in a light scattering state). The above-mentioned characteristics of the polymer network stabilizes liquid crystal material may be used in the above-mentioned liquid crystal layer 30 to display images.

As an example, a liquid crystal component based on a polymer network stabilized liquid crystal material may form a polymer network by irradiating with ultraviolet after filling ordinary liquid crystal molecules and polymerizable liquid crystal monomers in a liquid crystal cell. Affected by the polymer network, a response speed of the liquid crystal may reach within 2 milliseconds, for example.

The liquid crystal is dispersed in an organic solid polymer matrix in a form of droplets (for example, on an order of micrometers) to form the polymer dispersed liquid crystal (PDLC) material. Specifically, the liquid crystal layer 30 in a form of a polymer film layer made of PDLC is prepared by, for example, dispersing the liquid crystal molecules in the liquid crystal layer in a form of droplets with disorderly arrangement of optical axis orientation in an organic solid polymer matrix contained in the liquid crystal layer. Since the respective optical axes of the droplets composed of liquid crystal molecules are in free orientation or random orientation when no electric field is applied, a refractive index of the liquid crystal molecules does not match a refractive index of the polymer matrix, so that when the light incident into the polymer dispersed liquid crystal material passes through the polymer matrix, the light may be scattered in all directions by the droplets dispersed in the polymer matrix, so that the polymer dispersed liquid crystal material is in an opaque state or semi-transparent state (i.e., light scattering state) to the light incident into the polymer dispersed liquid crystal material. When an electric field is applied to the polymer dispersed liquid crystal material, the optical axis orientation of the liquid crystal droplets may be adjusted to be aligned along the applied electric field. In a case that the refractive index of the liquid crystal molecules matches the refractive index of the polymer matrix, when the light incident into the polymer dispersed liquid crystal material passes through the polymer matrix, the light transmits through the polymer matrix (rather than being scatted by the droplets dispersed in the polymer matrix), and the polymer dispersed liquid crystal material is in a transparent state (that is, a light transmission state) to the light incident into the polymer dispersed liquid crystal material. After the electric field is removed, the liquid crystal droplets return to an original state of scattering the light incident into the polymer dispersed liquid crystal material in all directions (in this case, the polymer dispersed liquid crystal material returns to the light scattering state). The above-mentioned characteristics of the polymer dispersed liquid crystal material may be used to control an intensity of the light passing through the PDLC film layer by changing a voltage thereon.

Figure 2:
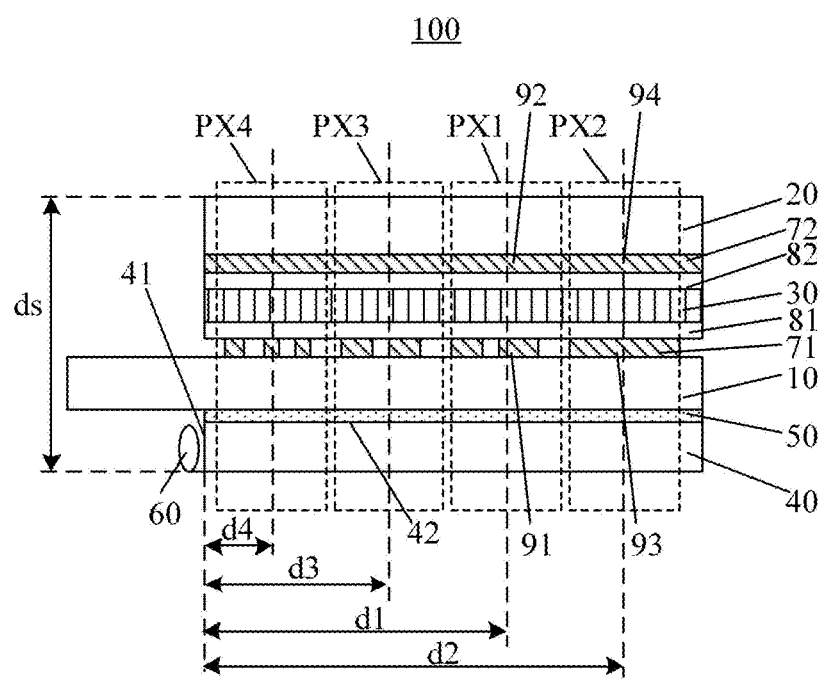
FIG. 2 is a diagram of a film structure of a transparent display panel according to the embodiments of the present disclosure.

FIG. 2 shows a film structure diagram of the transparent display panel 100 according to the embodiments of the present disclosure. A plurality of pixel units PX are arranged on the transparent display panel 100, and the plurality of pixel units PX include a first pixel unit PX1 and a second pixel unit PX2. The first pixel unit PX1 is located in the near light source area. For example, a distance d1 from a center of an orthographic projection of the first pixel unit PX1 on the light exit surface 42 of the light guide plate 40 to the light incident surface 41 of the light guide plate 40 is less than a first threshold. The second pixel unit PX2 is located outside the near light source area, for example, a distance d2 from a center of an orthographic projection of the second pixel unit PX2 on the light exit surface 42 of the light guide plate 40 to the light incident surface 41 of the light guide plate 40 is greater than the first threshold.

As shown in FIG. 2, in addition to the aforementioned structures of the first substrate 10, the second substrate 20, the liquid crystal layer 30, and the light guide plate 40, the transparent display panel 100 may further include a first electrode layer 71 located between the first substrate 10 and the liquid crystal layer 30; a second electrode layer 72 located between the second substrate 20 and the liquid crystal layer 30; a first liquid crystal alignment layer 81 located between the liquid crystal layer 30 and the first electrode layer 71; and a second liquid crystal alignment layer 82 located between the liquid crystal layer 30 and the second electrode layer 72. Both the first electrode layer 71 and the second electrode layer 72 may be made of, for example, a transparent conductive material (for example, indium tin oxide).

In the transparent liquid crystal display panel according to the embodiments of the present disclosure, a light-emitting intensity of the pixel unit PX is in an increasing function relationship with an area of an effective modulation area of the liquid crystal layer in the pixel unit PX. That is, the larger the area of the effective modulation area of the liquid crystal layer in the pixel unit PX, the higher the light-emitting intensity of the pixel unit PX. It should be understood that the transparent liquid crystal display panel modulates a part of the liquid crystal layer located in each pixel unit PX by applying an appropriate voltage to the above-mentioned first electrode layer 71 and second electrode layer 72 in the pixel unit PX, so as to adjust the light-emitting intensity of the display panel.

The effective modulation area of the liquid crystal layer in the pixel unit PX refers to an area in which the liquid crystal layer in the pixel unit PX may be actually modulated when a voltage is applied to the first electrode layer 71 and the second electrode layer 72 described above. A size of the effective modulation area of the liquid crystal layer in the pixel unit PX is related to at least two factors. The first is an overlapping area of the first electrode layer 71 and the second electrode layer 72 in the pixel unit PX (more precisely, an overlapping area of an orthographic projection of the first electrode layer 71 and an orthographic projection of the second electrode layer 72 on a certain plane (such as the light exit surface of the light guide plate)). Only an area in which the first electrode layer 71 and the second electrode layer 72 overlap in the pixel unit PX may be an area that actually modulates the liquid crystal molecules. The second is a liquid crystal polymerization area in the liquid crystal layer. As described above, whether it is the PSLC material or the PDLC material, it is necessary to use ultraviolet radiation to polymerize the liquid crystal so as to realize a function of switching between the transmission state and the scattering state. The area in the liquid crystal layer irradiated with ultraviolet to polymerize the liquid crystal may be referred to as the liquid crystal polymerization area. Only liquid crystal molecules in the liquid crystal polymerization area may realize the above-mentioned function of switching between the transmission state and the scattering state. Therefore, in fact, an area of the liquid crystal layer in which the liquid crystal polymerization area, the first electrode layer 71 and the second electrode layer 72 overlap is an area that really modulates the liquid crystal molecules, that is, the effective modulation area of the liquid crystal layer.

In the embodiments, an area of an orthographic projection of the effective modulation area of the liquid crystal layer in the first pixel unit PX1 on the light exit surface 42 of the light guide plate 40 is less than an area of an orthographic projection of the effective modulation area of the liquid crystal layer in the second pixel unit PX2 on the light exit surface 42 of the light guide plate 40. In this way, when a voltage is applied to the first electrode layer 71 and the second electrode layer 72 described above, a number of liquid crystal molecules modulated in the first pixel unit PX1 may be less than a number of liquid crystal molecules modulated in the second pixel unit PX2. Therefore, an intensity of the emitted light in the first pixel unit PX1 is reduced compared to a case that the effective modulation area of the liquid crystal layer is the same as that of the second pixel unit PX2, which is beneficial to decrease a difference between an intensity of the emitted light near the light source and an intensity of the emitted light far away from the light source, thereby improving the uniformity of the brightness of the display panel.

In the embodiments, an area of an orthographic projection of the effective modulation area of the liquid crystal layer in the first pixel unit PX1 on the light exit surface 42 of the light guide plate 40 is 20% to 80%, for example, 40% to 60%, of an area of an orthographic projection the effective modulation area of the liquid crystal layer in the second pixel unit PX2 on the light exit surface 42 of the light guide plate 40. As an example, the first threshold may be 10 to 50 times a distance (as shown by ds on FIG. 2) between a surface of the second substrate 20 away from the liquid crystal layer 30 and a surface of the light guide plate 40 away from the liquid crystal layer 30, preferably 20 to 30 times, for example, the first threshold may be between 1 cm and 3 cm.

In the embodiments, all the pixel units PX whose distances from centers of orthographic projections of the pixel units PX on the light exit surface 42 of the light guide plate 40 to the light incident surface 41 of the light guide plate 40 are greater than the first threshold have a same area of the effective modulation area of the liquid crystal layer. That is, the adjustment of the effective modulation area of the liquid crystal layer is only performed in the near light source area. However, the embodiments of the present disclosure are not limited to this. For example, some adjustments may be made to the effective modulation area of the liquid crystal layer in different pixel units (for example, the second pixel unit PX2) outside the near light source area.

In the embodiments, the effective modulation area of the liquid crystal layer in a plurality of pixel units PX in the near light source area may be further adjusted. For example, areas of effective modulation areas of the liquid crystal layer in the plurality of pixel units in the near light source area (distances from centers of orthographic projections of the plurality of pixel units on the light exit surface 42 of the light guide plate 40 to the light incident surface 41 of the light guide plate 40 are less than the first threshold) decrease as the distances from the centers of the orthographic projections of the pixel units PX on the light exit surface 42 of the light guide plate 40 to the light incident surface 41 of the light guide plate 40 decrease.

It can be seen from FIG. 3 that in the near light source area described above, the brightness also changes significantly with the distance from the light source. Therefore, in the embodiments, the effective modulation area of the liquid crystal layer in the pixel units in the near light source area may be further designed. For example, the plurality of pixel units PX may further include a third pixel unit PX3. As shown in FIG. 2, a distance d1 from the center of the orthographic projection of the first pixel unit PX1 on the light exit surface 42 of the light guide plate 40 to the light incident surface 41 of the light guide plate 40 is less than the first threshold and greater than a second threshold. A distance d3 from a center of an orthographic projection of the third pixel unit PX3 on the light exit surface 42 of the light guide plate 40 to the light incident surface 41 of the light guide plate 40 is less than the second threshold. An area of the orthographic projection of the effective modulation area of the liquid crystal layer in the third pixel unit PX3 on the light exit surface 42 of the light guide plate 40 is less than the area of the orthographic projection of the effective modulation area of the liquid crystal layer in the first pixel unit PX1 on the light exit surface 42 of the light guide plate 40. Such a design may further improve the brightness uniformity of the transparent liquid crystal display panel.

The effective modulation area of the liquid crystal layer in other pixel units in the near light source area may also be adjusted depending on the distances between the pixel units and the light source. As an example, the plurality of pixel units PX may further include a fourth pixel unit PX4, and the distance d3 from the center of the orthographic projection of the third pixel unit PX3 on the light exit surface 42 of the light guide plate 40 to the light incident surface 41 of the light guide plate 40 is less than the second threshold and greater than a third threshold. A distance d4 from a center of an orthographic projection of the fourth pixel unit PX4 on the light exit surface 42 of the light guide plate 40 to the light incident surface 41 of the light guide plate 40 is less than the third threshold. An area of the orthographic projection of the effective modulation area of the liquid crystal layer in the fourth pixel unit PX4 on the light exit surface 42 of the light guide plate 40 is less than the area of the orthographic projection of the effective modulation area of the liquid crystal layer in the third pixel unit PX3 on the light exit surface 42 of the light guide plate 40.

In the embodiments, a difference between the first threshold and the second threshold is equal to a difference between the second threshold and the third threshold. The area of the orthographic projection of the effective modulation area of the liquid crystal layer in the first pixel unit PX1 on the light exit surface 42 of the light guide plate 40, the area of the orthographic projection of the effective modulation area of the liquid crystal layer in the third pixel unit PX3 on the light exit surface 42 of the light guide plate 40, and the area of the orthographic projection of the effective modulation area of the liquid crystal layer in the fourth pixel unit PX4 on the light exit surface 42 of the light guide plate 40 decreases successively 5% to 10% of the area of the orthographic projection of the effective modulation area of the liquid crystal layer in the second pixel unit PX2 on the light exit surface 42 of the light guide plate 40. This finer adjustment may further improve the brightness uniformity in the near light source area. The above-mentioned numerical values are merely exemplary, and specific numerical values may be determined according to actual needs.

As described above, the area in which the liquid crystal polymerization area, the first electrode layer 71 and the second electrode layer 72 overlap in the liquid crystal layer is the area that really modulates the liquid crystal molecules, that is, the effective modulation area of the liquid crystal layer. However, when the liquid crystal polymerization area in the liquid crystal layer is uniformly distributed (for example, during the manufacturing process, a part of the liquid crystal layer corresponding to each pixel unit PX is irradiated by ultraviolet to form the liquid crystal polymerization area), and the effective modulation area of the liquid crystal layer may be determined by the overlapping area of the two electrodes in the pixel unit.

For the convenience of description, a part of the first electrode layer 71 located in the first pixel unit PX1 is defined as a first transparent electrode 91, and a part of the second electrode layer 72 located in the first pixel unit PX1 is defined as a second transparent electrode 92; and a part of the first electrode layer 71 in the second pixel unit PX2 is defined as a third transparent electrode 93, and a part of the second electrode layer 72 in the second pixel unit PX2 is defined as a fourth transparent electrode 94. As an example, the first pixel unit PX1 includes the first transparent electrode 91 and the second transparent electrode 92 for modulating the liquid crystal layer 30, and the second pixel unit PX2 includes the third transparent electrode 93 and the fourth transparent electrode 94 for modulating the liquid crystal layer. An effective modulation area of the liquid crystal layer in the first pixel unit PX1 may be an overlapping area of an orthographic projection of the first transparent electrode 91 on the light exit surface 42 of the light guide plate 40 and an orthographic projection of the second transparent electrode 92 on the light exit surface 42 of the light guide plate 40. An effective modulation area of the liquid crystal layer in the second pixel unit PX2 may be an overlapping area of an orthographic projection of the third transparent electrode 93 on the light exit surface 42 of the light guide plate 40 and an orthographic projection of the fourth transparent electrode 94 on the light exit surface 42 of the light guide plate 40.

In this manner, the effective modulation area of the liquid crystal layer may be adjusted by changing an area of an electrode in each pixel unit PX. For example, the first transparent electrode 91 and the third transparent electrode 93 are located on a side of the liquid crystal layer 30 facing the light exit surface 42 of the light guide plate 40, and the second transparent electrode 92 and the fourth transparent electrode 94 are located on a side of the liquid crystal layer 30 facing the second substrate 20. An area of an orthographic projection of at least one of the first transparent electrode 91 and the second transparent electrode 92 on the light exit surface 42 of the light guide plate 40 is less than an area of an orthographic projection of at least one of the third transparent electrode 93 and the fourth transparent electrode 94 on the light exit surface 42 of the light guide plate 40. Specifically, four cases may be included here, that is, an area of an orthographic projection of the first transparent electrode 91 on the light exit surface 42 of the light guide plate 40 is less than an area of an orthographic projection of the third transparent electrode 93 on the light exit surface 42 of the light guide plate 40; an area of an orthographic projection the second transparent electrode 92 on the light exit surface 42 of the light guide plate 40 is less than the area of the orthographic projection of the third transparent electrode 93 on the light exit surface 42 of the light guide plate 40; an area of an orthographic projection of the first transparent electrode 91 on the light exit surface 42 of the light guide plate 40 is less than an area of an orthographic projection of the fourth transparent electrode 94 on the light exit surface 42 of the light guide plate 40; and an area of an orthographic projection of the second transparent electrode 92 on the light exit surface 42 of the light guide plate 40 is less than the area of the orthographic projection of the fourth transparent electrode 94 on the light exit surface 42 of the light guide plate 40.

Specifically, the adjustment of the effective modulation area of the liquid crystal layer may be achieved by patterning certain electrodes in each pixel unit PX. For example, when it is necessary to reduce the area of the effective modulation area of the liquid crystal layer in the first pixel unit PX1, a hollow pattern may be formed in one or both of the first transparent electrode 91 and the second transparent electrode 92. Similarly, the adjustment of the area of the effective modulation area of the liquid crystal layer in any other pixel unit may also be achieved by patterning other electrodes in the corresponding pixel unit.

FIG. 4J shows a schematic diagram of the first electrode layer (a pixel electrode in this example) that is not patterned in a transparent liquid crystal display panel. Each square in FIG. 4J indicates a pixel electrode used in one pixel unit. Area A in FIG. 4J indicates a near light source area, and area B indicates a non-near light source area. In the embodiments, the pixel electrode in the area A may be patterned. FIGS. 4A to 4I respectively show an example in which the pixel electrode in FIG. 4J is patterned. A dark portion indicates a remaining electrode entity, and a white portion indicates an electrode hollow area in which the electrode material is removed. It should be noted that FIGS. 4G to 4I also include dummy electrodes 95a, 95b, and 95c. The dummy electrodes 95a, 95b, and 95c may be located in the electrode hollow area, and are not electrically connected to a power supply of the liquid crystal display panel, and are not used to modulate the liquid crystal layer. Therefore, it does not affect the effective modulation area of the liquid crystal layer in the pixel unit. The dummy electrodes 95a, 95b, and 95c are provided to reduce the light transmittance in the electrode hollow area. It should be understood that although transparent electrodes may be used in the transparent liquid crystal display panel, there is usually a decrease in transmittance in an area where the entity of the transparent electrode is compared with a hollow area of the transparent electrode. This difference in transmittance may also adversely affect the brightness uniformity of the display panel. After the dummy electrodes are arranged in the electrode hollow area, the effect of reducing the effective modulation area of the liquid crystal layer may be achieved, and the difference in transmittance may be reduced to avoid affecting the brightness uniformity of the display panel.

Figure 5A:
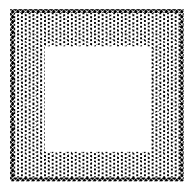
FIG. 5A, FIG. 5B, FIG. 5C, FIG. 5D, FIG. 5E, FIG. 5F, FIG. 5G, FIG. 5H, FIG. 5I, and FIG. 5J are schematic diagrams of patterned pixel electrodes in a near light source area on a second substrate.
Figure 5B:
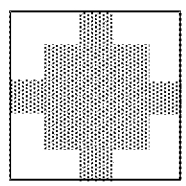
Figure 5C:
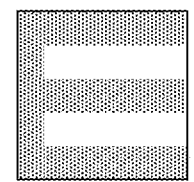
Figure 5D:
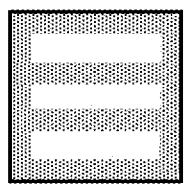
Figure 5E:
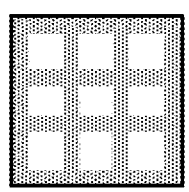
Figure 5F:
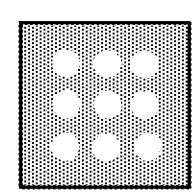
Figure 5G:
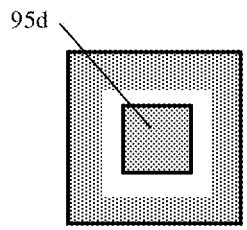
Figure 5H:
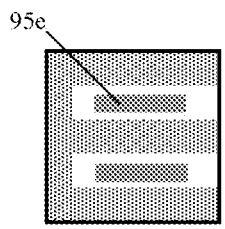
Figure 5I:
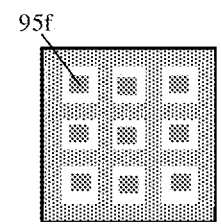
Figure 5J:
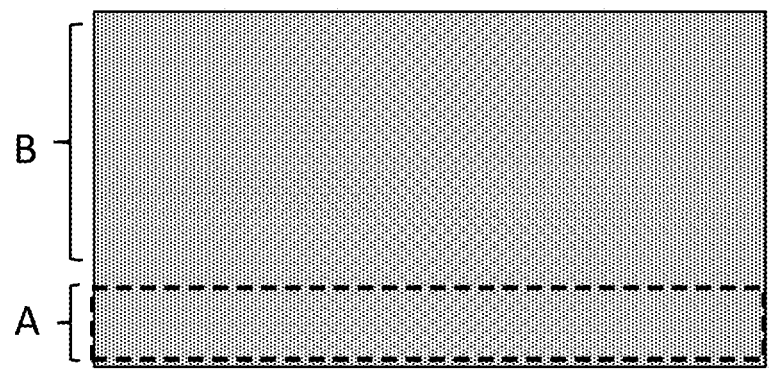

FIG. 5J shows a schematic diagram of the second electrode layer (a common electrode in this example) that is not patterned in the transparent liquid crystal display panel. In this example, the second electrode layer is in a form of a surface electrode, but the embodiments of the present disclosure are not limited to this. For example, the second electrode layer may also have other forms, such as strip electrodes. Area A in FIG. 5J indicates a near light source area, and area B indicates a non-near light source area. In the embodiments, the pixel electrode in the area A may be patterned. FIGS. 5A to 5I respectively show an example in which the common electrode in FIG. 5J is patterned. A dark portion indicates a remaining electrode entity, and a white portion indicates an electrode hollow area where the electrode material is removed. Similar to the foregoing FIGS. 4G to 4I, FIGS. 5G to 5I also include dummy electrodes 95d, 95e, and 95f.

In the embodiments, as shown in FIGS. 4G to 4I, the orthographic projection of the first transparent electrode 91 on the light exit surface 42 of the light guide plate 40 has a hollow area. In FIG. 4G, the hollow area of the first transparent electrode 91 is a square hole in the center; in FIG. 4H, the hollow area of the first transparent electrode 91 is three elongated holes; in FIG. 4I, the hollow area of the first transparent electrode 91 is nine small square holes. Correspondingly, as shown in FIGS. 5G to 5I, the orthographic projection of the second transparent electrode 92 on the light exit surface 42 of the light guide plate 40 may also have a hollow area. In FIG. 5G, the hollow area of the second transparent electrode 92 is a square hole in the center; in FIG. 5H, the hollow area of the second transparent electrode 92 is two elongated holes; in FIG. 5I, the hollow area of the second transparent electrode 92 is nine small square holes. The first pixel unit PX1 may further include a dummy electrode, and the dummy electrode is not electrically connected to the first transparent electrode 91 and the second transparent electrode 92. An orthographic projection of the dummy electrode on the light exit surface 42 of the light guide plate 40 is located in a hollow area of the orthographic projection of the first transparent electrode 91 or the second transparent electrode 92 on the light exit surface 42 of the light guide plate 40. The function of the dummy electrode is clarified above, and will not be repeated here.

FIGS. 6A, 6B, 6C, and 6D show examples in which two electrodes in a same pixel unit are patterned at the same time. A dark portion indicates a remaining electrode entity, and a white portion indicates an electrode hollow area where the electrode material is removed. In this case, the effective modulation area of the liquid crystal layer in the pixel unit is determined by an overlapping area of the physical areas of the two electrodes. In other embodiments, for example, as shown in FIG. 6A, an orthographic projection of the electrode (for example, the second transparent electrode 92) in the second electrode layer 72 on the light exit surface 42 of the light guide plate 40 has a hollow area (with a square hole in the center). In this case, a dummy electrode (similar to the form of FIG. 5G) may also be arranged in the hollow area. At this time, an orthographic projection of the dummy electrode on the light exit surface 42 of the light guide plate 40 may overlap with the orthographic projection of the electrode (for example, the first transparent electrode 91) in the first electrode layer 71 on the light exit surface 42 of the light guide plate 40. The embodiments of the present disclosure are not limited to this. For example, the orthographic projection of the dummy electrode on the light exit surface 42 of the light guide plate 40 is located in a hollow area of the orthographic projection of one of the first transparent electrode 91 and the second transparent electrode 92 on the light exit surface 42 of the light guide plate 40, and at least partially overlap with the orthographic projection of another of the first transparent electrode 91 and the second transparent electrode 92 on the light exit surface 42 of the light guide plate 40.

In the embodiments described above, the electrode in the pixel unit is patterned to adjust the area of the effective modulation area of the liquid crystal layer. This method only needs to change the electrode pattern, does not increase the difficulty of the manufacturing process, and is beneficial to the cost.

On the other hand, as described above, the area of the effective modulation area of the liquid crystal layer may also be adjusted by changing the liquid crystal polymerization area in the pixel unit. In the embodiments, the area of the orthographic projection of the liquid crystal polymerization area (in the liquid crystal layer 30) of the first pixel unit PX1 on the light exit surface 42 of the light guide plate 40 is less than the area of the orthographic projection of the liquid crystal polymerization area in the second pixel unit PX2 on the light exit surface 42 of the light guide plate 40. As an example, the area of the orthographic projection of the liquid crystal polymerization area in the first pixel unit PX1 on the light exit surface 42 of the light guide plate 40 is 40% to 60% of the area of the orthographic projection of the liquid crystal polymerization area in the second pixel unit PX2 on the light exit surface 42 of the light guide plate 40. Similar to this, the liquid crystal polymerization area in other pixel units except the first pixel unit PX1 may also be adjusted.

FIGS. 7A to 7D show examples of adjusting the liquid crystal polymerization area when the liquid crystal layer is irradiated with ultraviolet. As shown in FIG. 7D, area A indicates a near light source area, and area B indicates a non-near light source area. When the liquid crystal layer is irradiated with ultraviolet, a liquid crystal polymerization area in the pixel unit in the area A may be made smaller by applying a mask 85 on the area A. Liquid crystal molecules in a part of the liquid crystal layer 30 that are shielded by the mask 85 and not irradiated by ultraviolet may not polymerize. The liquid crystal polymerization area is determined by a light-transmitting part of the mask. FIGS. 7A to 7C show three types of mask patterns. In FIGS. 7A to 7D, a dark portion is a light-shielding part of the mask, and a hollow portion (such as a round hole, a rectangular hole, or a square hole) on the mask is a light-transmitting part. These mask patterns have different light-transmitting areas and may be used to form liquid crystal polymerization areas of different sizes, so as to adjust the area of the effective modulation area of the liquid crystal layer in the pixel unit. For example, a light-shielding area of an area where the mask 85 overlaps with the first pixel unit PX1 may be less than a light-shielding area of an area where the mask 85 overlaps with the second pixel unit PX2. This may be used to set the area of the effective modulation area of the liquid crystal layer in the first pixel unit PX1 to be less than that in the second pixel unit PX2. Adjusting the area of the effective modulation area of the liquid crystal layer in the pixel unit by changing the liquid crystal polymerization area requires additional preparation of a mask for ultraviolet irradiating the liquid crystal layer. The mask may be made of any light-shielding material (for example, metal), does not need to be integrated with the display panel, and may be used repeatedly for different display panels during the manufacturing process of the display panel.

In the embodiments of the present disclosure, the solutions of patterning the electrodes and adjusting the liquid crystal polymerization area may also be used in combination to change the area of the effective modulation area of the liquid crystal layer in the pixel unit.

In the embodiments of the present disclosure, the liquid crystal layer 30 may include a polymer network stabilized liquid crystal or a polymer dispersed liquid crystal, for example.

Figure 8:
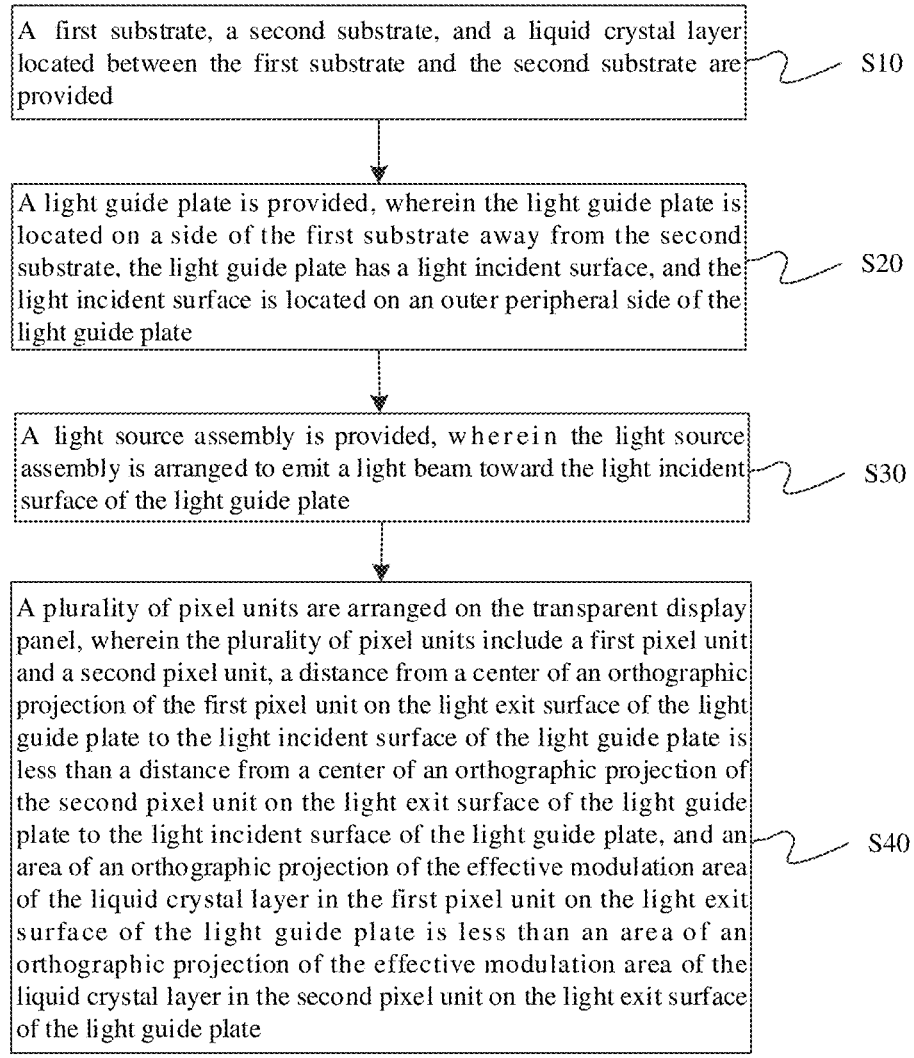
FIG. 8 schematically shows a flow chart of a method for manufacturing a transparent display panel according to the embodiments of the present disclosure.

The embodiments of the present disclosure also provide a method for manufacturing the transparent display panel. As shown in FIG. 8, the method includes the follows.

Step S10: a first substrate, a second substrate, and a liquid crystal layer located between the first substrate and the second substrate are provided.

Step S20: a light guide plate is provided, and the light guide plate is located on a side of the first substrate away from the second substrate, the light guide plate has a light incident surface, and the light incident surface is on an outer peripheral side of the light guide plate.

Step S30: a light source assembly is provided, and the light source assembly is arranged to emit a light beam toward the light incident surface of the light guide plate.

Step S40: a plurality of pixel units are arranged on the transparent display panel, and the plurality of pixel units include a first pixel unit and a second pixel unit. A distance from a center of an orthographic projection of the first pixel unit on the light exit surface of the light guide plate to the light incident surface of the light guide plate is less than a distance from a center of an orthographic projection of the second pixel unit on the light exit surface of the light guide plate to the light incident surface of the light guide plate. An area of an orthographic projection of the effective modulation area of the liquid crystal layer in the first pixel unit on the light exit surface of the light guide plate is less than an area of an orthographic projection of the effective modulation area of the liquid crystal layer in the second pixel unit on the light exit surface of the light guide plate.

In this manner, as described above, the effective modulation area of the liquid crystal layer in the pixel unit may be adjusted to improve the brightness uniformity of the transparent display panel.

As an example, the distance from the center of the orthographic projection of the first pixel unit PX1 on the light exit surface 42 of the light guide plate 40 to the light incident surface 41 of the light guide plate 40 is less than the first threshold, and the distance from the center of the orthographic projection of the second pixel unit PX2 on the light exit surface 42 of the light guide plate 40 to the light incident surface 41 of the light guide plate 40 is greater than the first threshold. The first threshold is 10 to 50 times a distance between a surface of the second substrate 20 away from the liquid crystal layer 30 and a surface of the light guide plate 40 away from the liquid crystal layer 30.

In the embodiments, the step S40 described above may further include: patterning one or both of the first transparent electrode and the second transparent electrode in the first pixel unit, so that an overlapping area of the orthographic projection of the first transparent electrode in the first pixel unit on the light exit surface of the light guide plate and the orthographic projection of the second transparent electrode in the first pixel unit on the light exit surface of the light guide plate is less than an overlapping area of the orthographic projection of the first transparent electrode in the first pixel unit on the light exit surface of the light guide plate and the orthographic projection of the second transparent electrode in the first pixel unit on the light exit surface of the light guide plate.

In other embodiments, the step S40 described above may further include: a mask is used to irradiate the liquid crystal layer between the first substrate and the second substrate with ultraviolet, and a light-shielding area of an area where the mask and the first pixel unit overlap is less than a light-shielding area of an area where the mask and the second pixel unit overlap.

The embodiments of the present disclosure also provide an electronic device, including the transparent display panel as described in any of the foregoing embodiments. The electronic device may be any device with a transparent display function, for example, including billboards, windows, digital photo frames, and so on.

Although the present disclosure is described with reference to the accompanying drawings, the embodiments disclosed in the accompanying drawings are intended to exemplify the embodiments of the present disclosure, and should not be understood as a limitation of the present disclosure. The size ratios in the accompanying drawings are only schematic and should not be construed as limiting the present disclosure.

The above-mentioned embodiments only exemplarily illustrate the principle and structure of the present disclosure, but are not used to limit the present disclosure. Those skilled in the art should understand that any changes made to the present disclosure without departing from the general idea of the present disclosure and improvements are within the scope of this disclosure. The protection scope of the present disclosure shall be subject to the scope defined by the claims of this application.

What is claimed is:

1. A transparent display panel, comprising:
   a first substrate;
   a second substrate;
   a liquid crystal layer located between the first substrate and the second substrate;
   a light guide plate located on a side of the first substrate away from the second substrate, wherein the light guide plate has a light incident surface on an outer peripheral side of the light guide plate;
   a light source assembly configured to emit a light beam toward the light incident surface of the light guide plate; and
   a plurality of pixel units on the transparent display panel, wherein the plurality of pixel units comprises a first pixel unit and a second pixel unit,
   wherein a distance from a center of an orthographic projection of the first pixel unit on a light exit surface of the light guide plate to the light incident surface of the light guide plate is less than a distance from a center of an orthographic projection of the second pixel unit on the light exit surface of the light guide plate to the light incident surface of the light guide plate;
   wherein an area of an orthographic projection of an effective modulation area of the liquid crystal layer in the first pixel unit on the light exit surface of the light guide plate is less than an area of an orthographic projection of an effective modulation area of the liquid crystal layer in the second pixel unit on the light exit surface of the light guide plate;
   wherein the first pixel unit comprises a first transparent electrode and a second transparent electrode for modulating the liquid crystal layer, the second pixel unit comprises a third transparent electrode and a fourth transparent electrode for modulating the liquid crystal layer, the effective modulation area of the liquid crystal layer in the first pixel unit is an overlapping area of an orthographic projection of the first transparent electrode on the light exit surface of the light guide plate and an orthographic projection of the second transparent electrode on the light exit surface of the light guide plate, and the effective modulation area of the liquid crystal layer in the second pixel unit is an overlapping area of an orthographic projection of the third transparent electrode on the light exit surface of the light guide plate and an orthographic projection of the fourth transparent electrode on the light exit surface of the light guide plate;
   wherein the first transparent electrode and the third transparent electrode are located on a side of the liquid crystal layer facing the light exit surface of the light guide plate, the second transparent electrode and the fourth transparent electrode are located on a side of the liquid crystal layer facing the second substrate, and an area of an orthographic projection of at least one of the first transparent electrode and the second transparent electrode on the light exit surface of the light guide plate is less than an area of an orthographic projection of at least one of the third transparent electrode and the fourth transparent electrode on the light exit surface of the light guide plate; and
   wherein the first pixel unit further comprises a dummy electrode, and the dummy electrode is not electrically connected to the first transparent electrode and the second transparent electrode, and the orthographic projection of the first transparent electrode or the second transparent electrode on the light exit surface of the light guide plate has a hollow area, and an orthographic projection of the dummy electrode on the light exit surface of the light guide plate is located in the hollow area.

2. The transparent display panel according to claim 1, wherein the distance from the center of the orthographic projection of the first pixel unit on the light exit surface of the light guide plate to the light incident surface of the light guide plate is less than a first threshold, the distance from the center of the orthographic projection of the second pixel unit on the light exit surface of the light guide plate to the light incident surface of the light guide plate is greater than the first threshold, and the first threshold is 10 to 50 times a distance between a surface of the second substrate away from the liquid crystal layer and a surface of the light guide plate away from the liquid crystal layer.

3. The transparent display panel according to claim 2, wherein the plurality of pixel units further comprise a third pixel unit, the distance from the center of the orthographic projection of the first pixel unit on the light exit surface of the light guide plate to the light incident surface of the light guide plate is less than the first threshold and greater than a second threshold, a distance from a center of an orthographic projection of the third pixel unit on the light exit surface of the light guide plate to the light incident surface of the light guide plate is less than the second threshold, and an area of an orthographic projection of an effective modulation area of the liquid crystal layer in the third pixel unit on the light exit surface of the light guide plate is less than the area of the orthographic projection of the effective modulation area of the liquid crystal layer in the first pixel unit on the light exit surface of the light guide plate.

4. The transparent display panel according to claim 3, wherein the plurality of pixel units further comprise a fourth pixel unit, the distance from the center of the orthographic projection of the third pixel unit on the light exit surface of the light guide plate to the light incident surface of the light guide plate is less than the second threshold and greater than a third threshold, a distance from a center of an orthographic projection of the fourth pixel unit on the light exit surface of the light guide plate to the light incident surface of the light guide plate is less than the third threshold, and an area of an orthographic projection of an effective modulation area of the liquid crystal layer in the fourth pixel unit on the light exit surface of the light guide plate is less than the area of the orthographic projection of the effective modulation area of the liquid crystal layer in the third pixel unit on the light exit surface of the light guide plate.

5. The transparent display panel according to claim 4, wherein a difference between the first threshold and the second threshold is equal to a difference between the second threshold and the third threshold, and the area of the orthographic projection of the effective modulation area of the liquid crystal layer in the first pixel unit on the light exit surface of the light guide plate, the area of the orthographic projection of the effective modulation area of the liquid crystal layer in the third pixel unit on the light exit surface of the light guide plate, and the area of the orthographic projection of the effective modulation area of the liquid crystal layer in the fourth pixel unit on the light exit surface of the light guide plate decreases successively 5% to 10% of the area of the orthographic projection of the effective modulation area of the liquid crystal layer in the second pixel unit on the light exit surface of the light guide plate.

6. The transparent display panel according to claim 2, wherein the pixel units at distances greater than the first threshold from centers of orthographic projections of the pixel units on the light exit surface of the light guide plate to the light incident surface of the light guide plate have a same area of the effective modulation area of the liquid crystal layer.

7. The transparent display panel according to claim 2, wherein areas of effective modulation areas of the liquid crystal layer in a plurality of pixel units at distances less than the first threshold from centers of orthographic projections of the plurality of pixel units on the light exit surface of the light guide plate to the light incident surface of the light guide plate decrease as the distances from the centers of the orthographic projections of the plurality of pixel units on the light exit surface of the light guide plate to the light incident surface of the light guide plate decrease.

8. The transparent display panel according to claim 1, wherein the area of the orthographic projection of the effective modulation area of the liquid crystal layer in the first pixel unit on the light exit surface of the light guide plate is 20% to 80% of the area of the orthographic projection the effective modulation area of the liquid crystal layer in the second pixel unit on the light exit surface of the light guide plate.

9. The transparent display panel according to claim 8, wherein the area of the orthographic projection of the effective modulation area of the liquid crystal layer in the first pixel unit on the light exit surface of the light guide plate is 40% to 60% of the area of the orthographic projection the effective modulation area of the liquid crystal layer in the second pixel unit on the light exit surface of the light guide plate.

10. The transparent display panel according to claim 1, wherein:
an area of an orthographic projection of a liquid crystal polymerization area in the first pixel unit on the light exit surface of the light guide plate is less than an area of an orthographic projection of a liquid crystal polymerization area in the second pixel unit on the light exit surface of the light guide plate; or
the liquid crystal layer comprises a polymer network stabilized liquid crystal or a polymer dispersed liquid crystal.

11. The transparent display panel according to claim 10, wherein the area of the orthographic projection of the liquid crystal polymerization area in the first pixel unit on the light exit surface of the light guide plate is 40% to 60% of the area of the orthographic projection of the liquid crystal polymerization area in the second pixel unit on the light exit surface of the light guide plate.

12. An electronic device comprising the transparent display panel according to claim 1.

13. A method for manufacturing a transparent display panel, comprising:
providing a first substrate, a second substrate, and a liquid crystal layer between the first substrate and the second substrate;
providing a light guide plate on a side of the first substrate away from the second substrate, wherein the light guide plate has a light incident surface on an outer peripheral side of the light guide plate;
providing a light source assembly, wherein the light source assembly is configured to emit a light beam toward the light incident surface of the light guide plate; and
providing a plurality of pixel units on the transparent display panel, wherein the plurality of pixel units comprises a first pixel unit and a second pixel unit,
wherein a distance from a center of an orthographic projection of the first pixel unit on a light exit surface of the light guide plate to the light incident surface of the light guide plate is less than a distance from a center of an orthographic projection of the second pixel unit on the light exit surface of the light guide plate to the light incident surface of the light guide plate, and
wherein an area of an orthographic projection of an effective modulation area of the liquid crystal layer in the first pixel unit on the light exit surface of the light guide plate is less than an area of an orthographic projection of an effective modulation area of the liquid crystal layer in the second pixel unit on the light exit surface of the light guide plate;
wherein providing a plurality of pixel units on the transparent display panel comprises:
patterning one or both of a first transparent electrode and a second transparent electrode in the first pixel unit, so that an overlapping area of an orthographic projection of the first transparent electrode in the first pixel unit on the light exit surface of the light guide plate and an orthographic projection of the second transparent electrode in the first pixel unit on the light exit surface of the light guide plate is less than an overlapping area of an orthographic projection of a first transparent electrode in the second pixel unit on the light exit surface of the light guide plate and an orthographic projection of a second transparent electrode in the second pixel unit on the light exit surface of the light guide plate; and
wherein the first pixel unit further comprises a dummy electrode, and the dummy electrode is not electrically connected to the first transparent electrode and the second transparent electrode, and the orthographic projection of the first transparent electrode or the second transparent electrode on the light exit surface of the light guide plate has a hollow area, and an orthographic projection of the dummy electrode on the light exit surface of the light guide plate is located in the hollow area.

14. The method according to claim 13, wherein providing a plurality of pixel units on the transparent display panel comprises:
irradiating the liquid crystal layer between the first substrate and the second substrate with ultraviolet by using a mask, wherein a light-shielding area of an area in which the mask and the first pixel unit overlap is less than a light-shielding area of an area in which the mask and the second pixel unit overlap.

15. A transparent display panel, comprising:
a first substrate;
a second substrate;
a liquid crystal layer located between the first substrate and the second substrate;
a light guide plate located on a side of the first substrate away from the second substrate, wherein the light guide plate has a light incident surface on an outer peripheral side of the light guide plate;
a light source assembly configured to emit a light beam toward the light incident surface of the light guide plate; and
a plurality of pixel units on the transparent display panel, wherein the plurality of pixel units comprises a first pixel unit and a second pixel unit,
wherein a distance from a center of an orthographic projection of the first pixel unit on a light exit surface of the light guide plate to the light incident surface of the light guide plate is less than a distance from a center of an orthographic projection of the second pixel unit on the light exit surface of the light guide plate to the light incident surface of the light guide plate;
wherein an area of an orthographic projection of an effective modulation area of the liquid crystal layer in the first pixel unit on the light exit surface of the light guide plate is less than an area of an orthographic projection of an effective modulation area of the liquid crystal layer in the second pixel unit on the light exit surface of the light guide plate;
wherein the first pixel unit comprises a first transparent electrode and a second transparent electrode for modulating the liquid crystal layer, the second pixel unit comprises a third transparent electrode and a fourth transparent electrode for modulating the liquid crystal layer, the effective modulation area of the liquid crystal layer in the first pixel unit is an overlapping area of an orthographic projection of the first transparent electrode on the light exit surface of the light guide plate and an orthographic projection of the second transparent electrode on the light exit surface of the light guide plate, and the effective modulation area of the liquid crystal layer in the second pixel unit is an overlapping area of an orthographic projection of the third transparent electrode on the light exit surface of the light guide plate and an orthographic projection of the fourth transparent electrode on the light exit surface of the light guide plate;
wherein the first transparent electrode and the third transparent electrode are located on a side of the liquid crystal layer facing the light exit surface of the light guide plate, the second transparent electrode and the fourth transparent electrode are located on a side of the liquid crystal layer facing the second substrate, and an area of an orthographic projection of at least one of the first transparent electrode and the second transparent electrode on the light exit surface of the light guide plate is less than an area of an orthographic projection of at least one of the third transparent electrode and the fourth transparent electrode on the light exit surface of the light guide plate; and
wherein the first pixel unit further comprises a dummy electrode, and the dummy electrode is not electrically connected to the first transparent electrode and the second transparent electrode, and the orthographic projection of one of the first transparent electrode and the second transparent electrode on the light exit surface of the light guide plate has a hollow area, and an orthographic projection of the dummy electrode on the light exit surface of the light guide plate is located in the hollow area, and at least partially overlap with the orthographic projection of another of the first transparent electrode and the second transparent electrode on the light exit surface of the light guide plate.

* * * * *